(12) United States Patent
Chen et al.

(10) Patent No.: US 11,105,463 B2
(45) Date of Patent: Aug. 31, 2021

(54) ROBOT TEACHING APPARATUS USING MOBILE TERMINAL

(71) Applicant: FANUC CORPORATION, Yamanashi (JP)

(72) Inventors: Tan Qin Chen, Yamanashi (JP); Tsuneyoshi Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 16/504,332

(22) Filed: Jul. 8, 2019

(65) Prior Publication Data

US 2020/0041067 A1    Feb. 6, 2020

(30) Foreign Application Priority Data

Aug. 1, 2018    (JP) .............................. JP2018-145273

(51) Int. Cl.
*F16M 11/00* (2006.01)
*F16M 13/04* (2006.01)
*B25J 13/06* (2006.01)

(52) U.S. Cl.
CPC .............. *F16M 13/04* (2013.01); *B25J 13/06* (2013.01)

(58) Field of Classification Search
CPC . A47F 7/0042; A47F 5/00; A47F 7/00; F16M 13/04; F16M 13/02; B25J 13/06; F16B 2/12; A45C 13/36; G08B 13/1409
See application file for complete search history.

(56) References Cited

U.S. PATENT DOCUMENTS

| | | | | |
|---|---|---|---|---|
| 6,311,530 B1 * | 11/2001 | Woodward | ............ | E05C 19/186 70/159 |
| 10,871,259 B2 * | 12/2020 | Nguyen | ............... | F16M 11/041 |
| 2014/0226298 A1 * | 8/2014 | Palmer | ................ | H05K 5/0208 361/807 |
| 2015/0129724 A1 * | 5/2015 | Kohmoto | ............... | F16M 13/00 248/52 |
| 2016/0297067 A1 | 10/2016 | Kogan et al. | | |

FOREIGN PATENT DOCUMENTS

| | | |
|---|---|---|
| JP | 2004-355195 A | 12/2004 |
| JP | 2016-60018 A | 4/2016 |
| JP | 201784309 A | 5/2017 |
| JP | 2017-202550 A | 11/2017 |
| JP | 2018-79541 A | 5/2018 |

* cited by examiner

*Primary Examiner* — Amy J. Sterling
(74) *Attorney, Agent, or Firm* — Hauptman Ham, LLP

(57) ABSTRACT

A robot teaching apparatus includes a safety switch unit including a claw adjustable in width and an adapter case corresponding to a shape of a mobile terminal and attached to the mobile terminal. An inner fitting portion that fits into an outer frame of the mobile terminal is disposed on at least a portion of an inside of the adapter case, and an outer fitting portion that fits with the claw of the safety switch unit is disposed on at least a portion of an outside of the adapter case.

6 Claims, 4 Drawing Sheets

ROBOT TEACHING APPARATUS USING MOBILE TERMINAL

RELATED APPLICATIONS

The present application claims priority of Japanese Application Number 2018-145273, filed Aug. 1, 2018, the disclosure of which is hereby incorporated by reference herein in its entirety.

BACKGROUND OF THE INVENTION

1. Field of the Invention

The present invention relates to a robot teaching apparatus using a mobile terminal, and particularly relates to a robot teaching apparatus including a safety switch unit coupled with a mobile terminal.

2. Description of the Related Art

Robot teaching apparatuses including a safety switch unit coupled with a mobile terminal are known. For example, the following documents are known in which a detachable coupling structure between a mobile terminal and a safety switch unit is disclosed.

JP 2018-79541 A discloses a structure in which an operation terminal is detachably attached to a safety switch device. A mounting structure includes a structure in which a mounting portion of the safety switch device encloses a portion of a housing of the operation terminal, or a structure that fits the operation terminal into a four corner mounting portion of the safety switch device.

JP 2017-202550 A discloses a structure for coupling a commercially available tablet terminal to an operation unit main body via an attachment. The attachment is provided with a pressing tool that presses a side surface of the tablet terminal using a spring, or is provided with a structure that conforms to the shape of an outer edge of the tablet terminal. By preparing the attachment in accordance with the shape of the commercially available tablet terminal, the same operation unit main body can be used in common.

JP 2016-60018 A discloses a base member provided with a clip that is detachably coupled to one side portion of a smart device.

JP 2004-355195 A discloses an emergency stop command device connected to an external interface connector of a PDA.

SUMMARY

In a robot teaching apparatus using a commercially available mobile terminal, when the number of parts of the safety switch unit is reduced and the weight is reduced from the perspective of portability, the coupling between the mobile terminal and the safety switch unit is more likely to be unstable. Moreover, a structure in which the safety switch unit is directly attached to the mobile terminal easily leads to failure caused by aging or the like. Furthermore, since commercially available mobile terminals have various shapes, it has been difficult for safety switch units to widely support commercially available mobile terminals.

Accordingly, although there have been attempts to prepare a plurality of types of adapters in accordance with the shapes of the mobile terminals and to couple the safety switch unit to the mobile terminal via the adapter, there are problems in which the mobile terminal falls off from the safety switch unit during coupling, or the mobile terminal is accidentally dropped when the coupling is released, leading to a failure of the mobile terminal.

There is therefore a demand for a robot teaching apparatus that widely supports the commercially available mobile terminals, prevents the mobile terminal from falling off from the safety switch unit, and allows protection of the mobile terminal when the coupling is released.

An aspect of the present disclosure is a robot teaching apparatus including a safety switch unit coupled with a mobile terminal, the safety switch unit including a claw adjustable in width; and an adapter case corresponding to a shape of the mobile terminal and attached to the mobile terminal. An inner fitting portion that fits into an outer frame of the mobile terminal is disposed on at least a portion of an inside of the adapter case, and an outer fitting portion that fits with the claw of the safety switch unit is disposed on at least a portion of an outside of the adapter case.

DESCRIPTION OF EXEMPLARY EMBODIMENTS

Figure 1A:
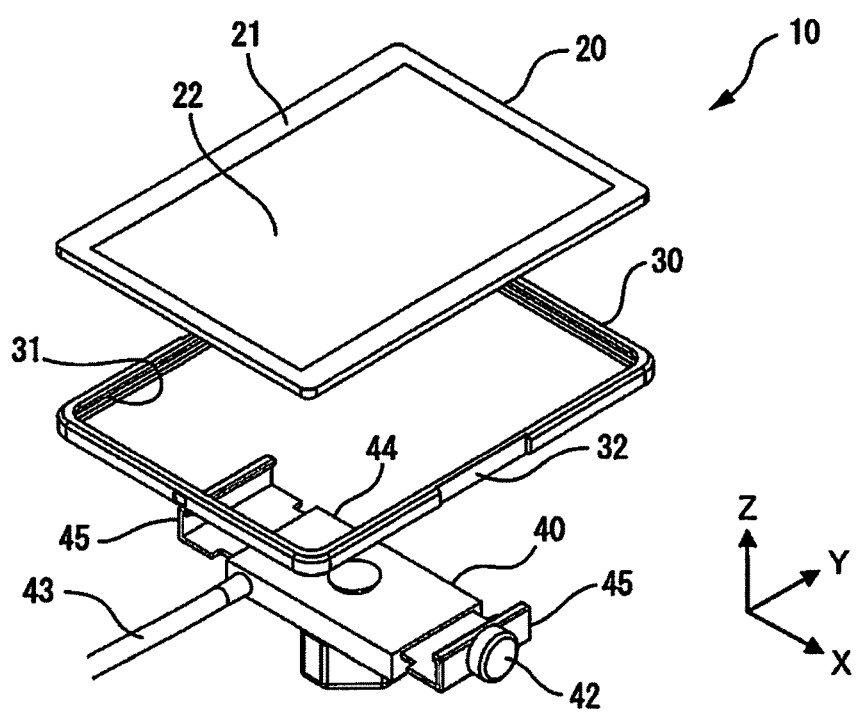
FIG. 1A is a front exploded perspective view of a robot teaching apparatus according to an embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

Figure 1B:
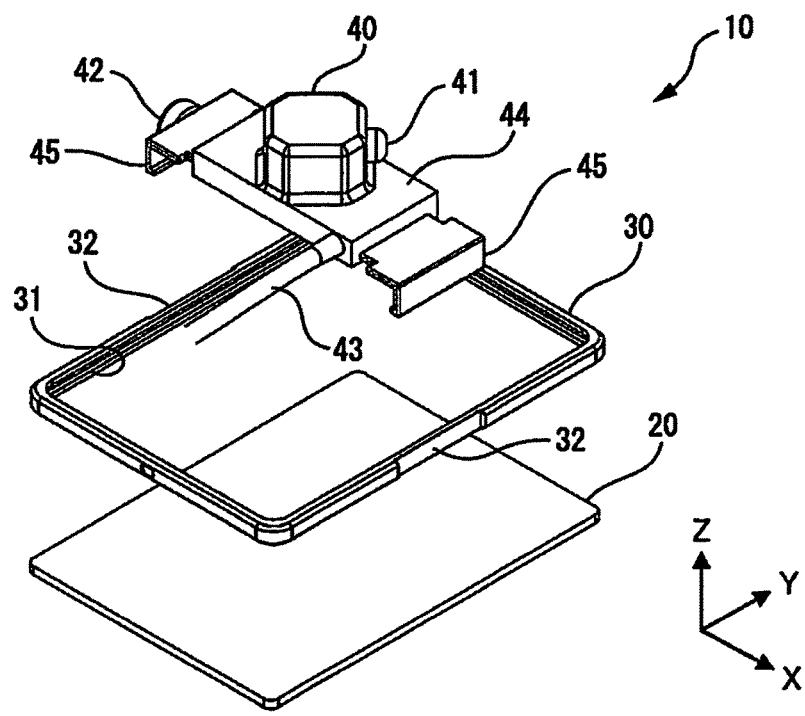
FIG. 1B is a rear exploded perspective view of a robot teaching apparatus according to an embodiment.

FIG. 1A and FIG. 1B are exploded perspective views of a front side and a rear side of a robot teaching apparatus 10 using a mobile terminal 20. The robot teaching apparatus 10 includes the mobile terminal 20 for the teaching of a robot (not illustrated), an adapter case 30 attached to the mobile terminal 20, and a safety switch unit 40 detachably coupled to the mobile terminal 20 via the adapter case 30.

The mobile terminal 20 is a commercially available mobile terminal, such as a tablet terminal, a PDA, a smartphone, or the like. The adapter case 30 is formed to correspond to the shape of the mobile terminal 20 using a flexible material, such as plastic or silicon, for example. The adapter case 30 may be annular as illustrated in FIG. 1A or may be C-shaped. The weight of the robot teaching apparatus 10 is reduced according to the shape of the adapter case 30. Alternatively, the adapter case 30 may have various external shapes, as with commercially available protective cases.

An inner fitting portion 31 that fits with an outer frame 21 of the mobile terminal 20 is disposed inside the adapter case 30. The inner fitting portion 31 may have a groove shape that receives the entire outer frame 21 of the mobile terminal 20, as illustrated in FIG. 1A, or may have a groove shape that receives a portion of the outer frame 21 of the mobile terminal 20, and is not limited thereto. Alternatively, the inner fitting portion 31 may have a claw shape (not illustrated) that hooks on a portion of the outer frame 21 of the mobile terminal 20, or may have various fitting shapes, as with commercially available protective cases.

The safety switch unit 40 is provided with a dead man switch 41, an emergency stop switch 42, and a signal transmission cable 43. The safety switch unit 40 is further provided with a unit main body 44 and a pair of claws 45 extending in opposite directions from the unit main body 44. The claw 45 can be adjusted to any width by using a spring mechanism, a locking mechanism, or the like (not illustrated). The tip end of the claw 45 has a sideways U-shaped vertical cross section and fits with the adapter case 30 attached to the mobile terminal 20. In accordance with the claw 45 having the sideways U-shaped vertical cross section, movement of the mobile terminal 20 with respect to the safety switch unit 40 is restricted in a Z direction that is perpendicular to a screen 22 of the mobile terminal 20.

An outer fitting portion 32 that fits with the claw 45 of the safety switch unit 40 is disposed on the outer side of the adapter case 30 in the longitudinal direction. The outer fitting portion 32 has a concave shape that receives the claw 45 as illustrated in FIG. 1, but is not limited thereto. In accordance with the outer fitting portion 32, sliding of the mobile terminal 20 with respect to the safety switch unit 40 is restricted in a Y direction that is parallel to the screen 22 of the mobile terminal 20, thereby preventing the mobile terminal 20 from falling off.

In another embodiment, the outer fitting portion 32 may be disposed on the outer side of the adapter case 30 in the lateral direction. In this case, the sliding of the mobile terminal 20 with respect to the safety switch unit 40 is restricted in an X direction that is parallel to the screen 22 of the mobile terminal 20. In addition, since the adapter case 30 is attached to the mobile terminal 20 side rather than the safety switch unit 40 side, the mobile terminal 20 is protected by the adapter case 30 even in a case where the mobile terminal 20 is dropped when the coupling between the safety switch unit 40 and the mobile terminal 20 is released.

Figure 2A:
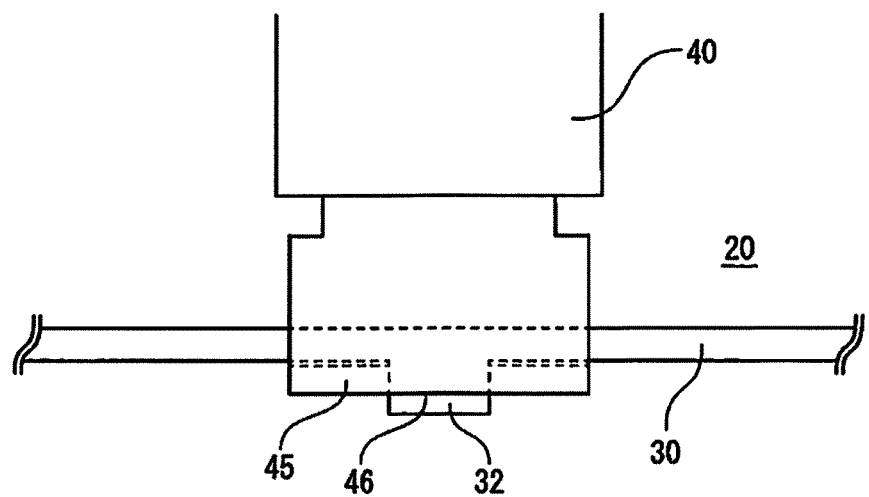
FIG. 2A is a partially enlarged plan view illustrating another coupling structure of a safety switch unit and a mobile terminal.

FIG. 2A is a partially enlarged plan view illustrating another coupling structure of the safety switch unit 40 and the mobile terminal 20. The outer fitting portion 32 of the adapter case 30 does not have the concave shape illustrated in FIG. 1A, but has a convex shape, and the claw 45 of the safety switch unit 40 includes an opening 46 through which the convex-shaped outer fitting portion 32 is inserted. The convex-shaped outer fitting portion 32 and the opening 46 of the claw 45 may be used to limit the sliding of the mobile terminal 20 with respect to the safety switch unit 40.

Figure 2B:
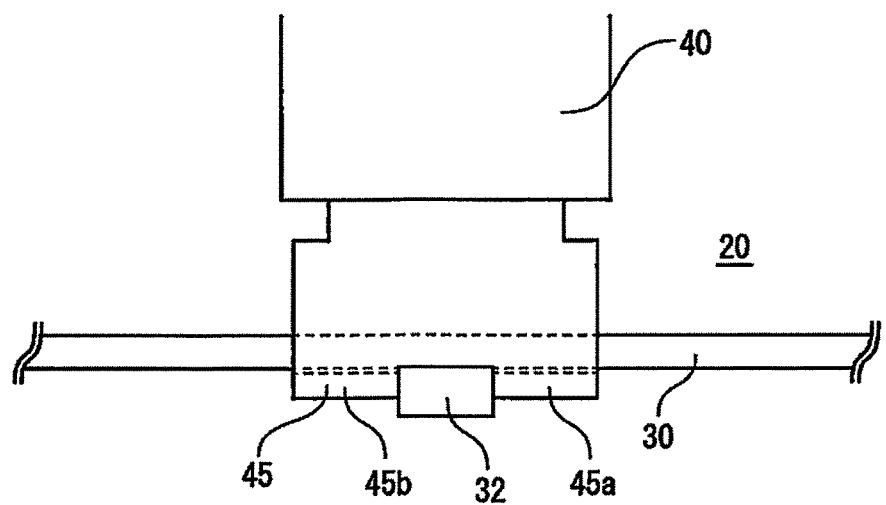
FIG. 2B is a partially enlarged plan view illustrating yet another coupling structure of a safety switch unit and a mobile terminal.

FIG. 2B is a partially enlarged plan view illustrating yet another coupling structure of the safety switch unit 40 and the mobile terminal 20. The outer fitting portion 32 of the adapter case 30 has the same convex shape as that in FIG. 2A, but the claw 45 of the safety switch unit 40 is divided into two claw portions and includes a first claw portion 45a and a second claw portion 45b that fit with the convex-shaped outer fitting portion 32. The convex-shaped outer fitting portion 32 and the first claw portion 45a and the second claw portion 45b may be used to restrict the sliding of the mobile terminal 20 with respect to the safety switch unit 40.

Figure 2C:
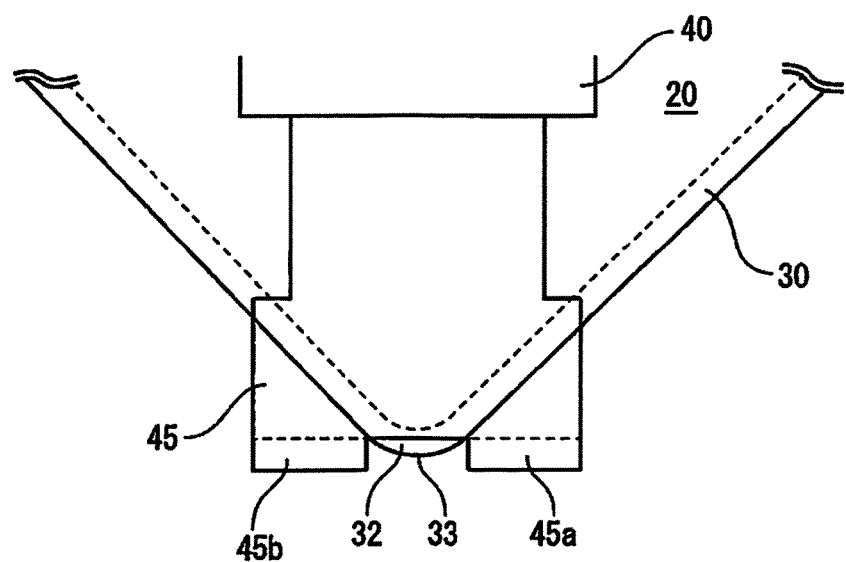
FIG. 2C is a partially enlarged plan view illustrating yet another coupling structure of the safety switch unit and the mobile terminal.

FIG. 2C is a partially enlarged plan view illustrating yet another coupling structure of the safety switch unit 40 and the mobile terminal 20. The outer fitting portion 32 of the adapter case 30 is a corner 33 of the adapter case 30, and the claw 45 of the safety switch unit 40 includes the first claw portion 45a and the second claw portion 45b that fit with the corner 33 of the adapter case 30. The corner 33 of the adapter case 30 and the first claw portion 45a and the second claw portion 45b may be used to restrict the sliding of the mobile terminal 20 with respect to the safety switch unit 40. In yet another embodiment, the claw 45 of the safety switch unit 40 may include an opening into which the corner 33 of the adapter case 30 is inserted.

According to the above-described embodiments, the sliding of the mobile terminal 20 with respect to the safety switch unit 40 is restricted by the safety switch unit 40 fitting with the adapter case 30, and the mobile terminal 20 is prevented from falling off. In addition, since the adapter case 30 is attached to the mobile terminal 20 side rather than the safety switch unit 40 side, the mobile terminal 20 is protected by the adapter case 30 even in a case where the mobile terminal 20 falls off when the coupling between the safety switch unit 40 and the mobile terminal 20 is released.

Although some embodiments have been described in this specification, the present invention is not limited to the above-described embodiments, and it is to be understood that various changes can be made without departing from the scope of the appended claims.

The invention claimed is:

1. A robot teaching apparatus comprising:
    a safety switch unit having at least one of an emergency stop switch or a dead man switch for a robot, the safety switch unit being coupled with a mobile terminal, the safety switch unit including a claw adjustable in width; and
    an adapter case corresponding to a shape of the mobile terminal and attached to the mobile terminal, wherein
    an inner fitting portion that fits into an outer frame of the mobile terminal is disposed on at least a portion of an inside of the adapter case, and
    an outer fitting portion that fits with the claw of the safety switch unit is disposed on at least a portion of an outside of the adapter case.

2. The robot teaching apparatus of claim 1, wherein the outer fitting portion has a concave shape that receives the claw.

3. The robot teaching apparatus of claim 1, wherein the outer fitting portion has a convex shape, and the claw includes an opening through which the outer fitting portion having the convex shape is inserted.

4. The robot teaching apparatus of claim 1, wherein the outer fitting portion has a convex shape, and the claw includes a first claw portion and a second claw portion that fit with the outer fitting portion having the convex shape.

5. The robot teaching apparatus of claim 1, wherein the outer fitting portion is a corner of the adapter case, and the claw includes a first claw portion and a second claw portion that fit with the corner of the adapter case.

6. The robot teaching apparatus of claim 1, wherein the outer fitting portion is a corner of the adapter case, and the claw includes an opening into which the corner of the adapter case is inserted.

* * * * *